United States Patent
Kim et al.

(10) Patent No.: US 10,543,454 B2
(45) Date of Patent: Jan. 28, 2020

(54) CARBON DIOXIDE ABSORBENT

(71) Applicant: UNIVERSITY-INDUSTRY COOPERATION GROUP OF KYUNG HEE UNIVERSITY, Yongin-si, Gyeonggi-do (KR)

(72) Inventors: Hoon Sik Kim, Seoul (KR); Ji Woo Lee, Namyangju-si (KR); Hyunji Lee, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 32 days.

(21) Appl. No.: 15/761,298

(22) PCT Filed: Sep. 20, 2016

(86) PCT No.: PCT/KR2016/010470
§ 371 (c)(1),
(2) Date: Mar. 19, 2018

(87) PCT Pub. No.: WO2017/052157
PCT Pub. Date: Mar. 30, 2017

(65) Prior Publication Data
US 2018/0257023 A1     Sep. 13, 2018

(30) Foreign Application Priority Data
Sep. 21, 2015 (KR) .......................... 10-2015-0133061

(51) Int. Cl.
*B01D 53/14*     (2006.01)
*B01D 53/96*     (2006.01)

(52) U.S. Cl.
CPC ..... *B01D 53/1493* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS 6,623,659 B2   9/2003   Munson et al.
6,849,774 B2   2/2005   Boudreau et al.
(Continued)

FOREIGN PATENT DOCUMENTS

JP             3197173 B2   8/2001
KR     10-2012-0034834 A   4/2012
(Continued)

OTHER PUBLICATIONS

Jinkyu Im et al., "Steric hindrance-induced zwitterionic carbonates from alkanolamines and $CO_2$: highly efficient $CO_2$ absorbents", Energy & Environmental Science, 2011, pp. 4284-4289, vol. 4.
(Continued)

*Primary Examiner* — Daniel Berns
(74) *Attorney, Agent, or Firm* — Sughrue Mion, PLLC

(57) ABSTRACT

The present invention provides a carbon dioxide absorbent comprising a primary amine and a dialkylene glycol dialkyl ether or trialkylene glycol dialkyl ether. The carbon dioxide absorbent according to the present invention has an excellent carbon dioxide absorptivity, absorption rate and regeneration property.

15 Claims, 1 Drawing Sheet

(52) U.S. Cl.
CPC .............. *B01D 2252/2025* (2013.01); *B01D 2252/20421* (2013.01)

(56) References Cited

U.S. PATENT DOCUMENTS

| | | | |
|---|---|---|---|
| 2008/0146849 A1 | 6/2008 | Dai et al. | |
| 2010/0319778 A1* | 12/2010 | Kastler | ............... C07D 471/06 |
| | | | 136/263 |
| 2011/0100217 A1 | 5/2011 | Soloveichik et al. | |

FOREIGN PATENT DOCUMENTS

| | | |
|---|---|---|
| KR | 10-2013-0000375 A | 1/2013 |
| KR | 10-1549950 B1 | 9/2015 |
| WO | 2004/089512 A1 | 10/2004 |
| WO | 2012/034921 A1 | 3/2012 |
| WO | 2012/093853 A2 | 7/2012 |
| WO | 2015/092427 A2 | 6/2015 |

OTHER PUBLICATIONS

Young-Seop Choi et al., "$CO_2$ Absorption and Desorption in an Aqueous Solution of Heavily Hindered Alkanolamine: Structural Elucidation of $CO_2$-Containing Species", Environmental Science & Technology, 2014, pp. 4163-4170, vol. 48.

Prachi Singh, "Amine Based Solvent for $CO_2$ Absorption "From Molecular Structure to Process"", Published 2011.

International Search Report of PCT/KR2016/010470 dated Dec. 28, 2016 [PCT/ISA/210].

* cited by examiner

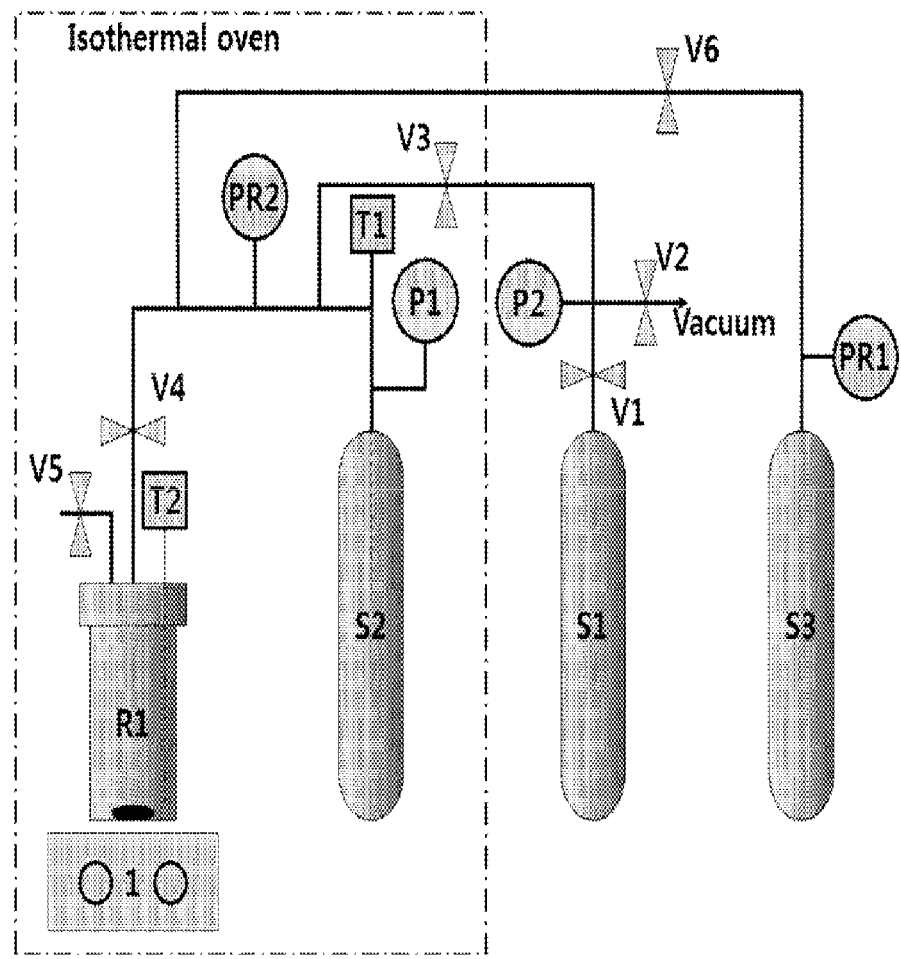

CARBON DIOXIDE ABSORBENT

CROSS REFERENCE TO RELATED APPLICATIONS

This application is a National Stage of International Application No. PCT/KR2016/010470, filed Sep. 20, 2016, claiming priority based on Korean Patent Application No. 10-2015-0133061, filed Sep. 21, 2015, of which contents are incorporated herein by reference in their entireties.

TECHNICAL FIELD

The present invention relates to a carbon dioxide absorbent comprising a primary amine and a dialkylene glycol dialkyl ether or trialkylene glycol dialkyl ether. More specifically, the present invention relates to a carbon dioxide absorbent having an excellent carbon dioxide absorptivity, absorption rate and regeneration property.

BACKGROUND ART

The most effective method for removing carbon dioxide ($CO_2$) from gas mixtures containing carbon dioxide such as gas mixtures obtained from hydrogen, steel and cement production processes, combustion exhaust gas generated from power plants using fossil fuels, and natural gas includes a physical absorption method using an organic solvent when the concentration of carbon dioxide is high, and a chemical absorption method using an amine-based aqueous solution when the concentration of carbon dioxide is low. Among them, the physical absorption method suitable for a gas mixture having a high concentration of carbon dioxide has already proved its economic efficiency and effectiveness in various commercialization processes such as hydrogen production and purification of natural gas, etc. On the other hand, when carbon dioxide is removed from combustion gas or the like having a low concentration of carbon dioxide, although chemical absorbents are much more effective than physical absorbents, the commercialization of the chemical absorbents remains unsolved due to the problem of high absorbent regeneration energy.

Amine aqueous solutions such as monoethanolamine (MEA), diethanolamine (DEA), piperazine and the like have been most extensively studied as the chemical absorbents, because these amine-based absorbents react with carbon dioxide to readily form stable carbamate compounds, and also, these compounds can be decomposed again into carbon dioxide and amines by heat. However, carbon dioxide capturing processes using these amine-based absorbents impose some serious problems. In particular, as the decomposition temperature is as high as 120° C. or more due to high thermal-chemical stability of carbamates produced from the reaction with carbon dioxide, in addition to a problem of excessive regeneration energy consumption (for MEA, 4.0~4.2 GJ of regeneration energy is needed per ton of carbon dioxide), a problem associated with excessive volatilization loss of amines (4 Kg/ton of MEA) due to the high regeneration temperature, and a problem of supplementing the absorbents accompanied by this, have been pointed out as disadvantages.

In order to overcome the disadvantages of these amine-based aqueous solution absorbents, attempts have been made to use an alkanolamine having a steric hindrance around the amine group of the alkanolamine as absorbent, and typical examples thereof include 2-amino-2-methyl-1-propanol (AMP) which is a primary amine. The AMP is characterized by forming a bicarbonate compound ([AMPH][$HCO_3$]) which can be readily regenerated compared to a carbamate during the reaction with carbon dioxide, and thus has an advantage of having regeneration energy which is 30% lower than that of MEA, but it also has a disadvantage in that it does not even reach 50% of the carbon dioxide absorption rate of MEA.

As a means to increase the absorption rate of AMP, Mitsubishi Heavy Industries and Kansai Electric Power Co., Inc. have jointly developed a novel absorbent in which piperazine as a secondary cyclic amine is added to AMP (Japanese Patent No. 3197173). However, the absorbent disclosed in this patent has a problem in that precipitation occurs during a carbon dioxide absorption process, and further, piperazine and carbon dioxide react with each other to form a thermally more stable carbamate in addition to the bicarbonate compound, and thus, there is a problem that regeneration is difficult.

In addition, there is also known a method which can reduce regeneration energy by using an alkali carbonate such as sodium carbonate or potassium carbonate as a carbon dioxide absorbent instead of a primary alkanolamine absorbent such as MEA, but it has a disadvantage of a low carbon dioxide absorption rate. As one of the methods for increasing carbon dioxide absorption rate, it has been reported in Published International Application WO 2004-089512 A1 that, when piperazine or a derivative thereof is added to potassium carbonate, the carbon dioxide absorption rate is greatly increased, but the problem of precipitation formation resulting from the use of carbonate still remains a challenge to be solved.

When carbon dioxide is captured using an amine-based absorbent using water as solvent, about 70% or more of consumed energy is used for regenerating the absorbent, and among them, 50% or more of the energy is known as energy required to vaporize water, that is, the energy attributed to the latent heat of water. This implies that, when the absorbent solvent is replaced by an organic solvent having a boiling point higher than the regeneration temperature of the absorbent and a low specific heat, instead of water having a high latent heat and specific heat, the energy consumed in the capturing process may be significantly reduced. Based on these findings, Published International Applications WO2012-034921 A1 and WO2012-093853 A1 disclose that a solution dissolved in AMP or t-butylaminoethanol (TBAE) having a steric hinderance can be used as a carbon dioxide absorbent. However, the absorbents disclosed in these patents have a severe disadvantage of heavy alcohol loss in the absorption and regeneration processes, because the absorption rate of carbon dioxide is significantly lower than that of MEA, and it can only be effective in alcohols having a low boiling point such as methanol. Further, the absorbents show the same performance as in methanol even in the presence of ethylene glycol (EG) solvent which is an alcohol having a high boiling point, but there exists a disadvantage in that the viscosity of the solution is excessively increased after the absorption of carbon dioxide, thereby imposing a restriction on the circulation of absorbent.

In addition, as a means to overcome the disadvantages of the conventional absorbents, as suggested in U.S. Pat. Nos. 6,849,774, 6,623,659, and U.S. Patent Application Publication No. 2008/0146849, attempts have been made to use ionic liquids which maintain a liquid phase at a low temperature of 100° C. or less while having no volatility and high thermal stability as non-aqueous absorbents. However, in order to synthesize these ionic liquids, it is necessary to go through a complicated production process involving two or more steps, and not only the production cost is excessively high, but also the viscosity of the absorption solution is high. Further, the carbon dioxide absorptivity and absorption rate at a low pressure are excessively low, and thus, it is not suitable for capturing carbon dioxide from exhaust gas emitted to the atmosphere after combustion.

DETAILED DESCRIPTION OF THE INVENTION

Technical Problem

The present inventors have made extensive efforts to study various types of non-aqueous-based absorbents that do not contain water in order to solve the problems associated with the latent heat of water, which is a fundamental problem of aqueous-based absorbents. As a result, they have found that, although most primary amines and secondary amines react with carbon dioxide in an organic solvent other than alcohols to form a precipitate, the primary amines having a steric hindrance around the amino group and a high lipophilic property do not form a precipitate even when they react with carbon dioxide in an ether solvent having a high boiling and containing two or more ether groups, and that the produced ionic carbamate compound decomposes rapidly at a temperature of 100° C. or less and can be regenerated as the original amine, thereby completing the present invention.

Accordingly, it is one object of the present invention to provide a carbon dioxide absorbent having an excellent carbon dioxide absorptivity, absorption rate and regeneration property.

Further, it is another object of the present invention to provide a method for separating carbon dioxide from a gaseous mixture using the carbon dioxide absorbent.

Technical Solution

The present invention relates to a carbon dioxide absorbent comprising a primary amine represented by Chemical Formula 1 below and a dialkylene glycol dialkyl ether or trialkylene glycol dialkyl ether represented by Chemical Formula 2 below:

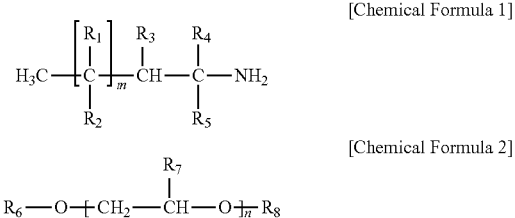

[Chemical Formula 1]

[Chemical Formula 2]

wherein,
$R_1$, $R_2$, $R_3$, $R_4$ and $R_5$ are each independently hydrogen or a $C_1$-$C_4$ alkyl group, preferably, hydrogen, methyl, ethyl, propyl or butyl,
at least one of $R_3$, $R_4$ and $R_5$ is a $C_1$-$C_4$ alkyl group, preferably, methyl, ethyl, propyl or butyl,
$R_6$ and $R_8$ are each independently a $C_1$-$C_4$ alkyl group, preferably, methyl, ethyl, propyl or butyl,
$R_7$ is hydrogen or methyl,
m is an integer of 1 to 9, and
n is an integer of 2 or 3.

In the present disclosure, the $C_1$-$C_4$ alkyl group means a straight chain or branched chain hydrocarbon composed of 1 to 4 carbon atoms. Examples thereof include methyl, ethyl, n-propyl, i-propyl, n-butyl, i-butyl, t-butyl and the like, but are not limited thereto.

The primary amine represented by Chemical Formula 1 may include 1,1,3,3-tetramethylbutylamine, 2-octylamine, 2-ethylhexylamine, 4-methyl-3-heptylamine, 2-methyl-3-heptylamine, 3-methyl-3-octylamine, 3-ethyl-2-heptylamine, 2-nonylamine, 3-nonylamine, 5-nonylamine, 3-methyl-3-nonylamine, 2-methyl-2-nonylamine, 3-undecylamine, 4-undecylamine, 2-dodecylamine, 3-dodecylamine, 2-ethyl-1-dodecylamine and the like, but is not limited thereto.

The dialkylene glycol dialkyl ether or trialkylene glycol dialkyl ether represented by Chemical Formula 2 may include diethylene glycol dimethyl ether, diethylene glycol diethyl ether, diethylene glycol ethyl methyl ether, diethylene glycol dipropyl ether, diethylene glycol dibutyl ether, dipropylene glycol dimethyl ether, dipropylene glycol diethyl ether, dipropylene glycol ethyl methyl ether, dipropylene glycol dipropyl ether, dipropylene glycol dibutyl ether, triethylene glycol dimethyl ether, triethylene glycol diethyl ether, triethylene glycol dipropyl ether, triethylene glycol dibutyl ether, tripropylene glycol dimethyl ether, tripropylene glycol diethyl ether, tripropylene glycol dipropyl ether, and tripropylene glycol dibutyl ether, but is not limited thereto.

The amount of the primary amine is 30 to 70% by weight, preferably 40 to 60% by weight, based on the total amount of the absorbent, considering the carbon dioxide absorptivity, absorption rate and the viscosity of the absorbent. When the amount of the primary amine is less than 30% by weight, the carbon dioxide absorption rate and absorptivity deteriorate. When the amount exceeds 70% by weight, an increase in the absorptivity and absorption rate is insignificant, and the viscosity of the absorption liquid increases, which makes the transport of the absorbent difficult, thereby increasing energy consumption.

The amount of the dialkylene glycol dialkyl ether or trialkylene glycol dialkyl ether is 30 to 70% by weight, preferably 40 to 60% by weight, based on the total amount of the absorbent. When the amount of the dialkylene glycol dialkyl ether or trialkylene glycol dialkyl ether is less than 30% by weight, there exists a problem associated with the viscosity of absorbent due to a high concentration of amine. When the amount exceeds 70% by weight, the amount of carbon dioxide absorption and absorption rate deteriorate as the concentration of amine decreases.

Although the carbon dioxide absorbent according to the present invention comprising the primary amine and the dialkylene glycol dialkyl ether or trialkylene glycol dialkyl ether exhibits an excellent carbon dioxide absorption and desorption capacity even under water free conditions, when the concentration of the primary amine is 50% or more, a dialkylene glycol dialkyl ether or trialkylene glycol dialkyl ether to which a small amount of water is added may be used considering the viscosity of the absorbent.

The amount of water in the absorbent is preferably within 15% by weight based on the total amount of the absorbent. When the amount of water exceeds 15% by weight, which is the maximum amount of water contained in the combustion exhaust gas, a problem arises in that the advantages of non-aqueous absorbents, which reduce the regeneration energy by the reduction in the latent heat of water, are greatly deteriorated.

The carbon dioxide absorbent according to the present invention has an advantage of enhancing the carbon dioxide absorptivity, absorption rate and regeneration property at the same time by using the primary amine as main absorbent and the dialkylene glycol dialkyl ether or trialkylene glycol dialkyl ether as solvent.

Among the constituents of the carbon dioxide absorbent according to the present invention, the primary amine having the structure of Chemical Formula 1 has a steric hindrance to a certain extent around the amino group compared to a primary amine such as MEA, but, in an aqueous phase, it forms an ionic carbamate compound having a high thermal stability, such as other primary amines, when it reacts with carbon dioxide, and thus, there is a problem that regeneration is difficult. However, when the dialkylene glycol dialkyl ether or trialkylene glycol dialkyl ether is present, the cations and anions of the ionic compound interact with oxygen atoms of the dialkyl ether, and as a result, the interaction between the cations and the anions of the carbamate compound is weakened, thereby facilitating the regeneration of the absorbent. Further, the dialkylene glycol dialkyl ether or trialkylene glycol dialkyl ether also plays a role in enhancing the carbon dioxide absorption rate, and this is because the hydrogen atoms of the amino group interact with the oxygen atoms of the dialkyl ether, consequently increasing the nucleophilicity of the amino group.

Accordingly, when the carbon dioxide absorbent according to the present invention is used, it is not necessary to consider the energy consumption by the latent heat of water, and thus, the total regeneration energy can be greatly reduced compared to the conventional aqueous-based absorbents, and also, the carbon dioxide absorption rate is much higher than that of ionic liquids and amine-alcohol mixed solutions, which are conventional non-aqueous absorbents. In addition, the carbon dioxide absorbent according to the present invention has the effect of significantly reducing the problems of corrosion and loss of absorbent commonly observed in the aqueous-based absorption processes.

On the other hand, the present invention relates to a method for separating carbon dioxide from a gaseous mixture using the carbon dioxide absorbent according to the present invention. The separation method of the present invention comprises the steps of:

(i) absorbing carbon dioxide using a carbon dioxide absorbent comprising a primary amine represented by Chemical Formula 1 and a dialkylene glycol dialkyl ether or trialkylene glycol dialkyl ether represented by Chemical Formula 2; and (ii) desorbing carbon dioxide absorbed in the carbon dioxide absorbent.

As the gaseous mixture, exhaust gas emitted from a chemical plant, a power plant, a steel mill, a cement plant, and a large-size boiler, and natural gas may be used.

The preferred absorption temperature for absorbing carbon dioxide in step (i) is in the range of 20° C. to 60° C., more preferably 30° C. to 50° C., and the preferred absorption pressure is in the range of atmospheric pressure to 20 atm, more preferably, atmospheric pressure to 10 atm. When the absorption temperature exceeds 60° C., the amount of carbon dioxide absorption is reduced as desorption of carbon dioxide is carried out simultaneously. When the absorption temperature is less than 20° C., an additional cooling equipment for lowering the temperature is required, thereby imposing a problem in view of economic efficiency. In addition, it is most economical to carry out the absorption at the atmospheric pressure, because the pressure of the exhaust gas is at the atmospheric pressure. When the absorption pressure exceeds 20 atm, the amount of absorption increases greatly, but an additional equipment for increasing the pressure, that is, a compressor, is required, thereby imposing a problem in view of economic efficiency.

The preferred temperature for desorbing the carbon dioxide absorbed in step (ii) is in the range of 80° C. to 140° C., more preferably, 90° C. to 120° C., and the desorption pressure is preferably in the range of atmospheric pressure to 2 atm. When the desorption temperature is less than 80° C., the desorption amount of carbon dioxide is greatly reduced. When the desorption temperature exceeds 140° C., a large amount of the absorbent is lost by evaporation. In addition, it is difficult to carry out the desorption at a high pressure of 2 atm or more, because the partial pressure of carbon dioxide must be high in order to maintain such a high pressure, and thus, a high temperature is required, which imposes a problem in view of economic efficiency.

As used in the present disclosure, the term "atmospheric pressure" is a barometric pressure, which refers to 1 atm.

Advantageous Effects

The carbon dioxide absorbent according to the present invention has a high carbon dioxide absorptivity and high absorption rate, and also, since no water is present or the concentration of water is very low, it is possible to greatly reduce the total energy consumption compared to the conventional aqueous-based absorbents and to prevent contamination of the restored carbon dioxide by moisture and absorbent vapor. In addition, it is possible to maintain the initial absorptivity even when the absorption and desorption processes are repeatedly carried out, and thus, it can be used as an excellent medium for separating carbon dioxide.

BRIEF DESCRIPTION OF DRAWINGS

FIG. 1 shows a schematic diagram of an experimental apparatus for absorption and desorption of carbon dioxide.

DETAILED DESCRIPTION OF THE EMBODIMENTS

Hereinafter, the present invention will be described in more detail by way of Examples. However, these Examples are given for illustrative purposes only, and the scope of the invention is not intended to be limited by these Examples.

Experimental Apparatus and Process for Carbon Dioxide Absorption

The experiment on carbon dioxide absorption performance was conducted using the apparatus of FIG. 1. The apparatus of FIG. 1 consisted of a 60 mL glass reactor for high pressure (R1) equipped with a thermometer (T2), a pressure transducer (P1) for high pressure (0 to 70 atm), a 75 mL carbon dioxide storage cylinder (S2) equipped with a thermometer (T1) and a stirrer (1), and it was installed in a thermostatic chamber in order to measure the carbon dioxide absorptivity at a predetermined temperature. In addition, a carbon dioxide supply container (S1) and a pressure gauge (P2) were installed on the exterior of the thermostatic chamber.

A predetermined amount of an absorbent and a magnet rod were added together in the absorption reactor (R1) of FIG. 1, and the weight of the reactor was measured. Then, the reactor was transferred to a constant temperature oven, and the temperature inside the reactor was maintained at 40° C. Subsequently, a valve (V4) connected to the absorption reactor (R1) was closed, and carbon dioxide of 50 atm was added to the storage cylinder (S2), then the equilibrium pressure and temperature were recorded. Then, the stirring of the absorption reactor (R1) was stopped, and the pressure of the absorption reactor (R1) was kept constant by using the valve (V4) and a pressure regulator. Thereafter, the pressure and temperature of the storage cylinder (S2) were recorded at the equilibrium state, and the pressure and temperature of S2 were recorded every 1 minute after initiation of stirring, then the change in the weight of the absorption reactor (R1) was measured after 30 minutes.

Further, for the desorption experiment, the valve (V4) was closed, and the temperature of the absorption reactor (R1) was raised to 80 to 140° C. Then, the valve (V4), a valve (V5) and a valve (V6) were opened, and the carbon dioxide was desorbed for 30 minutes while supplying the absorption reactor (R1) with nitrogen at 20 ml/min from the $N_2$ storage cylinder S3. Thereafter, the temperature was lowered to room temperature, and the change in the weight before and after desorption was measured.

EXAMPLES 1-9

30 g of a non-aqueous absorbent having a weight ratio of the primary amine/dialkylene glycol dialkyl in the following Table 1 of 55/45 was filled into ether or trialkylene glycol dialkyl ether disclosed the absorption reactor (R1) of FIG. 1, and the temperature of the reactor was fixed at 40° C., thereby carrying out the carbon dioxide absorption experiment. The stirring of the absorption reactor (R1) was stopped, and the pressure of the storage cylinder (S2) at the equilibrium state was recorded while maintaining the pressure of the absorption reactor (R1) at 1 atm using the valve (V4) and the pressure regulator. Then, the stirring was again initiated, and the change in the pressure of the storage cylinder (S2) was recorded up to 30 minutes at an interval of 1 minute, and the amount of carbon dioxide absorption was calculated therefrom. Further, in order to ensure the accuracy of the experiment, the weight of the reactor before and after the absorption was measured to obtain the amount of carbon dioxide absorption.

The desorption and carbon dioxide reabsorptivity experiment was carried out in the following manner: the valve (V4) was closed, and the temperature of the absorption reactor (R1) was raised to 100° C. Then, the valve (V4), the valve (V5) and the valve (V6) were opened, and carbon dioxide was desorbed for 30 minutes while supplying the absorption reactor (R1) with nitrogen at 20 ml/min. Then, carbon dioxide was reabsorbed at 40° C. Further, in order to ensure the accuracy of the measurements, the change in the weight of the absorption reactor (R1) before and after the absorption and desorption experiments. The results are shown in Table 1 below as the carbon dioxide absorptivity (g $CO_2$/Kg absorbent), the carbon dioxide reabsorptivity (g $CO_2$/Kg absorbent) during carbon dioxide reabsorption after desorption, and the regeneration rate (reabsorptivity after desorption/initial absorptivity).

TABLE 1

| Examples | Component of absorbent | | $CO_2$ absorptivity (g $CO_2$/Kg absorbent) | $CO_2$ reabsorptivity (g $CO_2$/Kg absorbent) | Regeneration rate (%) |
|---|---|---|---|---|---|
| | Primary amine | Dialkyl ether | | | |
| 1 | 2-octylamine | diethylene glycol diethyl ether | 110 | 107 | 97 |
| 2 | 4-methyl-3-heptylamine | dipropylene glycol dimethyl ether | 107 | 100 | 93 |
| 3 | 1,1,3,3-tetramethyl butylamine | diethylene glycol dibutyl ether | 103 | 95 | 98 |
| 4 | 2-ethylhexylamine | diethylene glycol diethyl ether | 112 | 110 | 98 |
| 5 | 3-methyl-3-octylamine | triethylene glycol dimethyl ether | 109 | 106 | 97 |
| 6 | 2-nonylamine | tripropylene glycol dipropyl ether | 104 | 96 | 92 |
| 7 | 3-nonylamine | diethylene glycol ethyl methyl ether | 107 | 102 | 95 |
| 8 | 3-undecylamine | diethylene glycol dipropyl ether | 102 | 97 | 95 |
| 9 | 2-ethyl-1-dodecylamine | tripropylene glycol diethyl ether | 105 | 104 | 98 |

EXAMPLES 10-13

The carbon dioxide absorption experiment was carried out in the same manner as in Example 1 by using the same absorbent as in Example 1, while fixing the pressure of carbon dioxide at 1 atm and changing the absorption temperature. The results are shown in Table 2 below.

TABLE 2

| Examples | Absorption temperature (° C.) | $CO_2$ absorptivity (g $CO_2$/Kg absorbent) | $CO_2$ reabsorptivity (g $CO_2$/Kg absorbent) | Regeneration rate (%) |
|---|---|---|---|---|
| 10 | 20 | 117 | 112 | 96 |
| 11 | 30 | 114 | 109 | 96 |
| 12 | 50 | 105 | 105 | 100 |
| 13 | 60 | 96 | 96 | 100 |

EXAMPLES 14-17

The carbon dioxide absorption experiment was carried out in the same manner as in Example 1 by using the same absorbent as in Example 1, while fixing the temperature at 40° C. and changing the absorption pressure. The results are shown in Table 3 below.

TABLE 3

| Examples | Absorption pressure (atmosphere) | $CO_2$ absorptivity (g $CO_2$/Kg absorbent) | $CO_2$ reabsorptivity (g $CO_2$/Kg absorbent) | Regeneration rate (%) |
|---|---|---|---|---|
| 14 | 2 | 115 | 113 | 98 |
| 15 | 5 | 121 | 119 | 98 |
| 16 | 10 | 130 | 129 | 99 |
| 17 | 20 | 133 | 132 | 99 |

EXAMPLES 18-24

The carbon dioxide absorption experiment was carried out in the same manner as in Example 1 while changing the % by weight of primary amine/diethylene glycol diethyl ether, and fixing the temperature at 40° C. and the pressure at 1 atm. The results are shown in Table 4 below.

TABLE 4

| Examples | Primary amine/diether composition (wt %) | $CO_2$ absorptivity (g $CO_2$/Kg absorbent) | $CO_2$ reabsorptivity (g $CO_2$/Kg absorbent) | Regeneration rate (%) |
|---|---|---|---|---|
| 18 | 20/80 | 41 | 41 | 100 |
| 19 | 30/70 | 62 | 62 | 100 |
| 20 | 40/60 | 84 | 83 | 99 |
| 21 | 50/50 | 102 | 100 | 98 |
| 22 | 60/40 | 121 | 115 | 95 |
| 23 | 65/35 | 126 | 120 | 95 |
| 24 | 70/30 | 131 | 124 | 95 |

EXAMPLES 25-27

The carbon dioxide absorption experiment was carried out by setting the weight of 2-octylamine to 65% as in Example 23, while changing the weight ratio of water to glycol diethyl ether under the condition in which glycol diethyl ether was present. The results are shown in Table 5 below.

TABLE 5

| Examples | Water/ether composition (wt %) | $CO_2$ absorptivity (g $CO_2$/Kg absorbent) | $CO_2$ reabsorptivity (g $CO_2$/Kg absorbent) | Regeneration rate (%) |
|---|---|---|---|---|
| 25 | 5/30 | 128 | 128 | 100 |
| 26 | 10/25 | 130 | 129 | 100 |
| 27 | 15/20 | 132 | 132 | 100 |

EXAMPLES 28-36

The change in the regeneration rate in accordance with the change in the desorption temperature and pressure was measured, while fixing the composition of absorbent and the absorption temperature (40° C.) as in Example 1. The results are shown in Table 6 below.

TABLE 6

| Examples | Desorption temperature (° C.) | Desorption pressure (atm) | $CO_2$ absorptivity (g $CO_2$/Kg absorbent) | $CO_2$ reabsorptivity (g $CO_2$/Kg absorbent) | Regeneration rate (%) |
|---|---|---|---|---|---|
| 28 | 80 | 1 | 110 | 75 | 68 |
| 29 | 90 | 1 | 110 | 97 | 88 |
| 30 | 100 | 2 | 110 | 108 | 98 |
| 31 | 110 | 2 | 110 | 110 | 100 |
| 32 | 120 | 1 | 110 | 110 | 100 |
| 33 | 130 | 2 | 110 | 110 | 100 |
| 34 | 140 | 1 | 110 | 110 | 100 |
| 35 | 110 | 1 | 110 | 110 | 100 |
| 36 | 120 | 2 | 110 | 110 | 100 |

COMPARATIVE EXAMPLE 1

An experiment in which carbon dioxide was absorbed at 1 atm and 40° C. using an aqueous solution containing 30% by weight of monoethanolamine as absorbent, and then desorbed at 100° C. under atmospheric pressure was carried out in the same manner as in Example 1. As a result, the carbon dioxide absorptivity was 125 g per 1 kg of absorbent. However, when carbon dioxide was reabsorbed after desorption at 100° C., the carbon dioxide absorptivity was 43 g, confirming that the regeneration rate was only 34.4%.

DESCRIPTION OF REFERENCE NUMERALS

R1: Absorption reactor
S1: CO$_2$ supply container
S2: CO$_2$ storage cylinder
S3: N$_2$ storage cylinder
P1: Pressure transducer for high pressure
PR1, PR2: Pressure regulator
T1, T2: Thermometer
V1 ~V6: Valve
1: Stirrer

The invention claimed is:

1. A carbon dioxide absorbent comprising a primary amine represented by Chemical Formula 1 below and a dialkylene glycol dialkyl ether or trialkylene glycol dialkyl ether represented by Chemical Formula 2 below:

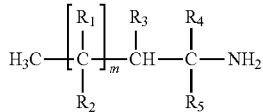

Chemical Formula 1

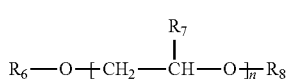

Chemical Formula 2 wherein,
R$_1$, R$_2$, R$_3$, R$_4$ and R$_5$ are each independently hydrogen or a C$_1$-C$_4$ alkyl group,
at least one of R$_3$, R$_4$ and R$_5$ is a C$_1$-C$_4$ alkyl group,
R$_6$ and R$_8$ are each independently a C$_1$-C$_4$ alkyl group,
R$_7$ is hydrogen or methyl,
m is an integer of 1 to 9, and
n is an integer of 2 or 3;
wherein an amount of the primary amine is 30 to 70% by weight based on a total amount of the absorbent.

2. The carbon dioxide absorbent of claim 1, wherein
R$_1$, R$_2$, R$_3$, R$_4$ and R$_5$ are each independently hydrogen, methyl, ethyl, propyl or butyl,
at least one of R$_3$, R$_4$ and R$_5$ is methyl, ethyl, propyl or butyl,
R$_6$ and R$_8$ are each independently methyl, ethyl, propyl or butyl, and
R$_7$ is hydrogen or methyl.

3. The carbon dioxide absorbent of claim 1, wherein the primary amine represented by the Chemical Formula 1 is selected from the group consisting of 1,1,3,3-tetramethylbutylamine, 2-octylamine, 2-ethylhexylamine, 4-methyl-3-heptylamine, 2-methyl-3-heptylamine, 3-methyl-3-octylamine, 3-ethyl-2-heptylamine, 2-nonylamine, 3-nonylamine, 5-nonylamine, 3-methyl-3-nonylamine, 2-methyl-2-nonylamine, 3-undecylamine, 4-undecylamine, 2-dodecylamine, 3-dodecylamine, and 2-ethyl-1-dodecylamine.

4. The carbon dioxide absorbent of claim 1, wherein the dialkylene glycol dialkyl ether or trialkylene glycol dialkyl ether represented by Chemical Formula 2 is selected from the group consisting of diethylene glycol dimethyl ether, diethylene glycol diethyl ether, diethylene glycol ethyl methyl ether, diethylene glycol dipropyl ether, diethylene glycol dibutyl ether, dipropylene glycol dimethyl ether, dipropylene glycol diethyl ether, dipropylene glycol ethyl methyl ether, dipropylene glycol dipropyl ether, dipropylene glycol dibutyl ether, triethylene glycol dimethyl ether, triethylene glycol diethyl ether, triethylene glycol dipropyl ether, triethylene glycol dibutyl ether, tripropylene glycol dimethyl ether, tripropylene glycol diethyl ether, tripropylene glycol dipropyl ether, and tripropylene glycol dibutyl ether.

5. The carbon dioxide absorbent of claim 1, wherein the amount of the dialkylene glycol dialkyl ether or trialkylene glycol dialkyl ether is 30 to 70% by weight based on the total amount of the absorbent.

6. The carbon dioxide absorbent of claim 1, further comprising water in an amount of 15% by weight or less based on the total amount of the absorbent.

7. A method of separating carbon dioxide from a gaseous mixture comprising the steps of (i) absorbing carbon dioxide using the carbon dioxide absorbent according to claim 1; and (ii) desorbing carbon dioxide absorbed in the carbon dioxide absorbent of (i).

8. The method of separating carbon dioxide of claim 7, wherein the absorption temperature in step (i) is in the range of 20° C. to 60° C.

9. The method of separating carbon dioxide of claim 7, wherein the absorption pressure in step (i) is in the range of atmospheric pressure to 20 atm.

10. The method of separating carbon dioxide of claim 7, wherein the desorption temperature in step (ii) is in the range of 80° C. to 140° C.

11. The method of separating carbon dioxide of claim 7, wherein the desorption pressure in step (ii) is in the range of atmospheric pressure to 2 atm.

12. A carbon dioxide absorbent comprising a primary amine represented by Chemical Formula 1 below and a dialkylene glycol dialkyl ether or trialkylene glycol dialkyl ether represented by Chemical Formula 2 below:

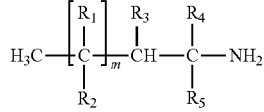

Chemical Formula 1

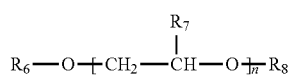

Chemical Formula 2 wherein,
R$_1$, R$_2$, R$_3$, R$_4$ and R$_5$ are each independently hydrogen or a C$_1$-C$_4$ alkyl group,
at least one of R$_3$, R$_4$ and R$_5$ is a C$_1$-C$_4$ alkyl group,
R$_6$ and R$_8$ are each independently a C$_1$-C$_4$ alkyl group,
R$_7$ is hydrogen or methyl,
m is an integer of 1 to 9, and
n is an integer of 2 or 3,
wherein the primary amine represented by the Chemical Formula 1 is selected from the group consisting of 1,1,3,3-tetramethylbutylamine, 2-octylamine, 2-ethylhexylamine, 4-methyl-3-heptylamine, 2-methyl-3-heptylamine, 3-methyl-3-octylamine, 3-ethyl-2-heptylamine, 2-nonylamine, 3-nonylamine, 5-nonylamine, 3-methyl-3-nonylamine, 2-methyl-2-nonylamine, 3-undecylamine, 4-undecylamine, 2-dodecylamine, 3-dodecylamine, and 2-ethyl-1-dodecylamine.

13. The carbon dioxide absorbent of claim 12, further comprising water in an amount of 15% by weight or less based on the total amount of the absorbent.

14. A carbon dioxide absorbent comprising a primary amine represented by Chemical Formula 1 below and a dialkylene glycol dialkyl ether or trialkylene glycol dialkyl ether represented by Chemical Formula 2 below:

Chemical Formula 1

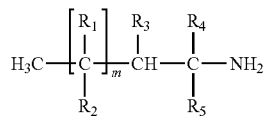

Chemical Formula 2

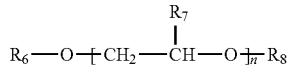

wherein,
$R_1$, $R_2$, $R_3$, $R_4$ and $R_5$ are each independently hydrogen or a $C_1$-$C_4$ alkyl group,
at least one of $R_3$, $R_4$ and $R_5$ is a $C_1$-$C_4$ alkyl group,
$R_6$ and $R_8$ are each independently a $C_1$-$C_4$ alkyl group,
$R_7$ is hydrogen or methyl,
m is an integer of 1 to 9, and
n is an integer of 2 or 3,
wherein the amount of the dialkylene glycol dialkyl ether or trialkylene glycol dialkyl ether is 30 to 70% by weight based on the total amount of the absorbent.

15. The carbon dioxide absorbent of claim 14, further comprising water in an amount of 15% by weight or less based on the total amount of the absorbent.

* * * * *